(12) United States Patent
Ryu et al.

(10) Patent No.: US 9,832,076 B2
(45) Date of Patent: Nov. 28, 2017

(54) RESOURCE CHANGE MANAGEMENT IN MACHINE TO MACHINE NETWORK

(71) Applicant: KT CORPORATION, Gyeonggi-do (KR)

(72) Inventors: Hwi-Jung Ryu, Seoul (KR); Mi-Kyoung Kang, Seoul (KR); Yong Kwon, Gyeonggi-do (KR); Sung-Ihk Yang, Seoul (KR); Kwang-Jin Lee, Seoul (KR); Sung-Kooc Lim, Gyeonggi-do (KR); Yu-Jin Huh, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 805 days.

(21) Appl. No.: 14/167,057

(22) Filed: Jan. 29, 2014

(65) Prior Publication Data
US 2014/0215043 A1 Jul. 31, 2014

(30) Foreign Application Priority Data

Jan. 29, 2013 (KR) ........................ 10-2013-0009954

(51) Int. Cl.
| | | |
|---|---|---|
| G06F 15/173 | (2006.01) | |
| H04L 12/24 | (2006.01) | |
| H04W 4/00 | (2009.01) | |
| G06F 17/30 | (2006.01) | |
| H04W 72/04 | (2009.01) | |

(Continued)

(52) U.S. Cl.
CPC .... H04L 41/0893 (2013.01); G06F 17/30876 (2013.01); H04W 4/005 (2013.01); H04L 41/0233 (2013.01); H04L 61/3015 (2013.01); H04W 72/042 (2013.01); H04W 92/18 (2013.01)

(58) Field of Classification Search
CPC ............ H04L 41/0893; H04L 41/0233; H04L 61/3015; G06F 17/30876; H04W 4/005; H04W 72/042; H04W 92/18
USPC ......................................................... 709/223
See application file for complete search history.

(56) References Cited

U.S. PATENT DOCUMENTS

2003/0070006 A1* 4/2003 Nadler .................... G06F 9/548
719/330
2006/0080639 A1* 4/2006 Bustelo .................... G06F 8/20
717/111

(Continued)

FOREIGN PATENT DOCUMENTS

| KR | 10-0661856 B1 | 12/2006 |
| KR | 10-0964191 B1 | 6/2010 |
| KR | 10-2010-0116469 A | 11/2010 |

OTHER PUBLICATIONS

Young Jun Kim et al., "Service Overlay Network Platform and Service Composition Method for M2M Service", Korea Computer Congress 2012, Jun. 29, 2012, pp. 230-232, vol. 39, No. 1.

*Primary Examiner* — Aaron Strange
*Assistant Examiner* — Timothy Sowa
(74) *Attorney, Agent, or Firm* — IP Legal Services, LLC

(57) ABSTRACT

The disclosure is related to managing a resource change in a machine to machine (M2M) network. Managing the resource change in M2M network by creating an abstract M2M entity object associated with a resource change, and creating an M2M entity object instance by embodying the abstract M2M entity object according to each application development environment.

18 Claims, 7 Drawing Sheets

(51) Int. Cl.
　　　*H04W 92/18*　　(2009.01)
　　　*H04L 29/12*　　(2006.01)

(56) References Cited

U.S. PATENT DOCUMENTS

| | | | |
|---|---|---|---|
| 2011/0016199 A1* | 1/2011 | De Carlo | H04W 4/005 709/220 |
| 2011/0202649 A1* | 8/2011 | Ryu | H04W 4/00 709/223 |
| 2012/0233586 A1* | 9/2012 | Lewis | G06F 8/10 717/104 |
| 2012/0272215 A1* | 10/2012 | Chouinard | G06F 21/10 717/124 |
| 2012/0317542 A1* | 12/2012 | Cook | G06F 8/24 717/104 |
| 2013/0066965 A1* | 3/2013 | Foti | H04L 67/24 709/204 |
| 2013/0203394 A1* | 8/2013 | Dong | H04W 4/005 455/414.1 |
| 2013/0336222 A1* | 12/2013 | Lu | H04W 72/00 370/328 |
| 2014/0126581 A1* | 5/2014 | Wang | H04W 4/001 370/431 |
| 2014/0317707 A1* | 10/2014 | Kim | H04W 12/04 726/6 |
| 2015/0009818 A1* | 1/2015 | Xiao | H04W 4/12 370/230.1 |
| 2015/0055640 A1* | 2/2015 | Wang | H04W 4/005 370/338 |
| 2015/0305008 A1* | 10/2015 | Kim | H04W 72/0406 370/329 |
| 2015/0373124 A1* | 12/2015 | Bhalla | H04W 4/005 709/202 |

\* cited by examiner

FIG. 8

```
class Picture
 {
private:
    enum int contentType;
    unsigned int NrofPeopleInsidePicture;
    byte* content;

public:
    unsigned int get_NrofPeople ();
    byte* get_picture();
}
```

```
class Device_manager
 {
private:
    . . .

public:
    Array<Command> command_list ();
    int turn_off (unsigned int time);
    int sleep(unsigned int time);
}
```

```
#include "Picture.h"
#include "Device_manager.h"

class CCTV Camera
 {
private:
    Picture pictures;
    Device_Manager manager;

public:
    int subscribe (String URI);
    void discovery ();
}
``` ated application No. 10-2013-0009954
(filed on Jan. 29, 2013), which is hereby incorporated by reference in its entirety.

RESOURCE CHANGE MANAGEMENT IN MACHINE TO MACHINE NETWORK

CROSS REFERENCE TO PRIOR APPLICATIONS

The present application claims priority under 35 U.S.C. §119 to Korean Patent Application No. 10-2013-0009954 (filed on Jan. 29, 2013), which is hereby incorporated by reference in its entirety.

TECHNICAL FIELD

The present disclosure relates to managing resources in a machine to machine (M2M) network, in particular, to performing a resource change management by automatically creating an abstract M2M entity object associated with a resource change in the M2M network.

BACKGROUND

In the European Telecommunication Standards Institute (ETSI) standard, resources forming an M2M network have unique resource identifiers (URIs). The URIs correspond to independent addresses allowing access to the respective resources. An addressing is a procedure of assigning the independent URIs to the respective resources and allowing access to the relevant resources through the URIs. Such URIs may be utilized as parameters of various supplementary operations associated with M2M resources.

The basic operation procedure for manipulating resources on the M2M network may include a resource create operation ("CREATE"), a resource retrieve operation ("RETRIEVE"), a resource update operation ("UPDATE"), and/or a resource delete operation ("DELETE").

A basic idea to perform all resource manipulation and processing procedures, which have been executed in a single domain, is through a simple operation using URIs assigned to the respective resources. This might be structured with a RESTful architecture.

For example, in the case that a user retrieves a certain web page, the user may retrieve the web page using a URI corresponding to an address of a relevant web page. More specifically, as long as a user knows a URI corresponding to the web page to be retrieved, the user may easily send a request message for retrieving information contained in the web page, through a web browser. In this case, data of a web page structured according to a corresponding standard may be transmitted to user equipment. The received data may be displayed in a form of retrievable screen information in the user equipment.

Similarly, a single M2M device in an M2M network may include certain functions and information like a single web page described above. In the case that an unknown M2M device (i.e., an M2M device whose function and information are not known) is connected to an M2M network, it is necessary to know the function and information of the connected M2M device by performing a mutual communication using a message defined in a corresponding standard.

In the ETSI standard, a 'discovery' is defined as an operation (or function) which finds out the function and/or information of a certain M2M device by performing a mutual communication using standardized messages. The discovery corresponds to an operation of making a request from the outside (e.g., an M2M gateway, an application, etc.) to a specific M2M device. URI lists of all opened resources existing in the specific M2M device may obtained through the discovery operation. More specifically, a 'discovery' operation may make it possible to determine what structure a certain M2M device has, what information the M2M device generates, and how to investigate the inside of the M2M device. For example, in order to obtain information on web pages provided by a web server, it is necessary to retrieve a pre-defined web page file in a root directory of the web server. Like this, an entry point of an M2M device retrieval may be obtained through a 'discovery' operation.

Meanwhile, an M2M application may be created using M2M devices. In this case, some typical procedures may be required to be performed. First, it may be necessary to obtain access rights to a corresponding M2M device. Second, it may be necessary to check where a specific function or information of an M2M device can be obtained in a URI list associated with the M2M device. Herein, the second procedure may be omitted if an administrator clearly understands a device design architecture and URIs of resources prior to application development. However, in a case of accessing an unknown M2M device in order to obtain desired information on the unknown M2M device connected to an M2M network, resources (e.g., function or information) that can be provided by the unknown M2M device may be obtained in a URI form. In this case, a certain resource may be accessed by explicitly designating a corresponding URI in an obtained URI list. Third, it may be necessary to create a message requesting desired resources. For example, in the case that a request for obtaining specific information is sent in a hypertext transfer protocol (HTTP) message form, an HTTP GET message is sent to a corresponding URI obtained in a previous operation. In this case, various parameters (e.g., a filter or the like) may be included in a message body according to the typical standards (e.g., ETSI M2M standard, HTTP standard, etc.).

As described above, in order to access an M2M device on an M2M network, a message may be required to be directly sent to a corresponding URI in a RESTful message form (e.g., RESTful HTTP message form). However, such a typical method may have several problems or limitations as follows.

First, the message (e.g., HTTP message) corresponds to a protocol of a character string form and is defined by a strict format. Therefore, a developer has to configure an message according to a format required in various M2M devices. In this case, various errors may occur during the message configuration procedure.

Second, in an M2M network, a resource structure, a device connection state (e.g., connection of a new M2M device, removal of an existing M2M device, etc.), and/or an internal environment of an M2M device may be frequently changed. In this case, in order to continuously support an access to the M2M device, generating a new version of URI while maintaining a past URI may be required. However, in this case, with respect to functions of the M2M device to be provided and URIs corresponding to the functions, difficulties may occur in a device or resource management.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a resource change management may be performed based on an abstract M2M entity object associated with a resource change in the M2M network. More specifically, in case of a resource change in an M2M network, the present embodiment may create the abstract M2M entity object using information (e.g., function, attribute, etc.) on an M2M entity associated with the resource change, and create an M2M entity object instance by embodying the abstract M2M entity object according to each application development environment. Herein, the abstract M2M entity object and the M2M entity object instance may be created by an M2M platform.

Furthermore, when a request for a specific operation receives from an M2M application, an M2M platform according to the present embodiment may perform a message protocol translation such that a communication (e.g. a request/response process) between the M2M application and a corresponding M2M network.

In accordance with an embodiment of the present invention, a method may be provided for managing a resource change in a machine to machine (M2M) network. The method may include receiving a resource change notification from the M2M network, obtaining information on at least one M2M entity associated with the resource change notification, from the M2M network, creating an abstract M2M entity object for each M2M entity, based on the M2M entity information, and creating an M2M entity object instance by embodying each abstract M2M entity object according to an M2M application development environment. The method may further include transmitting the M2M entity object instance to at least one of an M2M application and an M2M application developer terminal. The M2M entity may be at least one of an M2M device and an M2M gateway.

The method may further include pre-registering a unique resource identifier (URI) of an M2M agent to receive the resource change notification. The URI may be pre-registered in at least one of a network service capability layer (NSCL) and a gateway service capability layer (GSCL).

The obtaining may include transmitting a discovery operation request to the M2M network when the resource change notification is received, receiving a URI list associated with the resource change from the M2M network, transmitting an individual retrieval request for each URI included the URI list, to the M2M network, and obtaining the M2M entity information from the M2M network.

The M2M entity information may include at least one of function information, attribute information, M2M entity type information, M2M entity configuration information, interface information, and descriptions for each resource.

The M2M entity object instance may be embodied in a form of at least one of a static library and a remote procedure call (RPC) interface. The M2M entity object instance may be embodied using a high-level programming language.

In accordance with at least one embodiment, a platform apparatus may be provided for managing a resource change in a machine to machine (M2M) network. The platform apparatus may include an M2M agent and an object instant creation processor. The M2M agent may be configured to create an abstract M2M entity object for each of one or more M2M entity associated with the resource change, based on information on each M2M entity. The object instance creation processor may be configured to create an M2M entity object instance by embodying the abstract M2M entity object according to an application development environment, wherein the M2M entity object instance includes an interface function for a request of an M2M application.

The platform apparatus may further include a message translator configured to perform a message protocol translation for a data communication between the M2M network and the M2M application.

The message translator may be configured to further reflect a predetermined M2M network operation policy. The predetermined M2M network operation policy may include a unique resource identifier (URI) update for a path control.

The M2M agent may be configured to receive a resource change notification from the M2M network and to obtain the information on each M2M entity from the M2M network. The M2M agent may be configured to transmit a discovery operation request to the M2M network when the resource change notification is received, to receive a URI list associated with the resource change from the M2M network, to transmit an individual retrieval request for each URI included the URI list, to the M2M network, and to obtain the information on each M2M entity from the M2M network.

The M2M entity information may include at least one of function information, attribute information, M2M entity type information, M2M entity configuration information, interface information, and descriptions for each resource.

The M2M entity object instance may be embodied in a form of at least one of a static library and a remote procedure call (RPC) interface.

The object instance creation processor may be configured to receive a request message from the M2M application and to determine whether to transfer the request message to the M2M network, according to a validity of the request message. The validity of the request message may be determined based on the M2M entity object instance.

In accordance with at least one embodiment, a method may be provided for performing a message exchange between a machine to machine (M2M) application and an M2M network. The method may include receiving a request message from the M2M application, wherein the request message is created and transmitted according to one of an RPC function and a library function included in an M2M entity object instance employed for the M2M application, determining a validity of the request message, translating the request message to an M2M network protocol when the request message is valid, transmitting the translated request message to the M2M network, receiving a response message from the M2M network, translating the response message to an M2M application protocol, and transmitting the translated response message to the M2M application. The translating the request message may include reflecting a predetermined M2M network operation policy, wherein the predetermined M2M network operation policy includes a URI update for a path control.

BRIEF DESCRIPTION OF THE DRAWINGS

The above and/or other aspects of the present invention will become apparent and more readily appreciated from the following description of embodiments, taken in conjunction with the accompanying drawings, of which:

FIG. 8 illustrates an example of an M2M device object instance in accordance with at least one embodiment.

DESCRIPTION OF EMBODIMENTS

Figure 1:
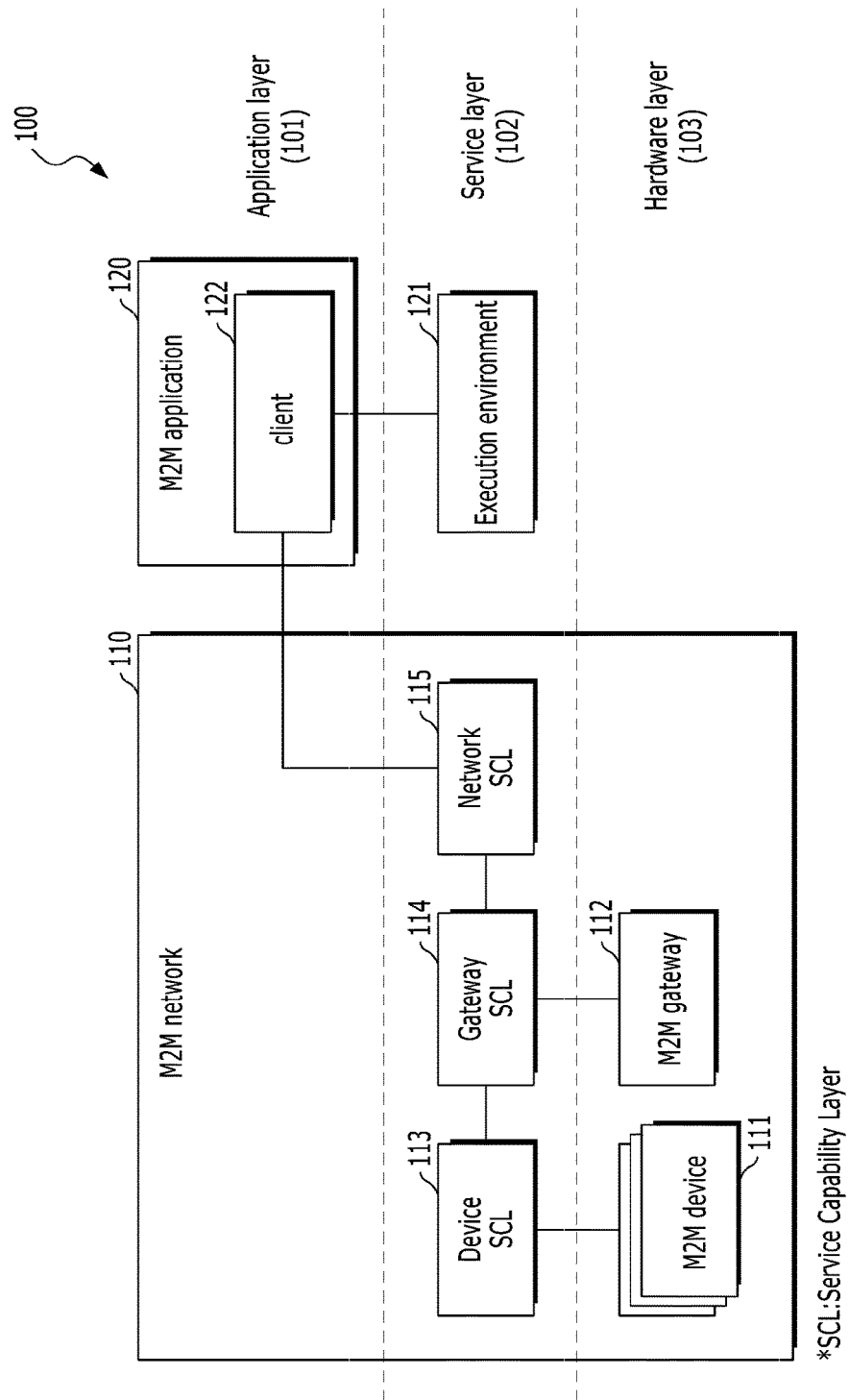
FIG. 1 illustrates an architecture of a typical M2M communication system.

Reference will now be made in detail to embodiments of the present invention, examples of which are illustrated in the accompanying drawings, wherein like reference numerals refer to like elements throughout. The embodiments are described below, in order to explain the present invention by referring to the figures.

The present embodiment may perform a resource change management based on an abstract M2M entity object, in the M2M network. More specifically, in case of a resource change in an M2M network, the present embodiment may create the abstract M2M entity object using information (e.g., function, attribute, etc.) on an M2M entity associated with the resource change, and create an M2M entity object instance by embodying the abstract M2M entity object according to each application development environment. Herein, the abstract M2M entity object and the M2M entity object instance may be created by an M2M platform.

Furthermore, when a request for a specific operation is received from an M2M application, an M2M platform according to the present embodiment may perform a message protocol translation such that a communication (e.g. a request/response process) between the M2M application and a corresponding M2M network occurs.

FIG. 1 illustrates an architecture of a typical M2M communication system.

As shown in FIG. 1, a typical M2M communication system such as M2M communication system 100 may include M2M network 110 and M2M application 120. In addition, each of M2M network 110 and M2M application 120 may be configured with a plurality of layers, such as application layer 101, service layer 102, and/or hardware layer 103.

Referring to FIG. 1, M2M network 110 may include hardware layer 103 and service layer 102. Hardware layer 103 may include a plurality of M2M devices 111 and M2M gateway 112. Service layer 102 may include (i) device service capability layer (SCL) (or may referred to as "DSCL") 113 connected to M2M devices 111, (ii) gateway SCL (or may referred to as "GSCL") 114 connected to M2M gateway 112, and (iii) network SCL (or may referred to as "NSCL") 115. A plurality of device SCLs 113 may be registered in gateway SCL 114, and a plurality of gateway SCLs 114 may be registered in network SCL 115.

Meanwhile, M2M application 120 may include execution environment 121 belonging to service layer 102, and client 122 belonging to the application layer 101. Herein, execution environment 121 may control a system driving and/or a runtime environment.

M2M application 120 may perform a series of procedures of searching functions and/or information of an M2M entity (e.g., M2M devices 111 or M2M gateway 112) that has already been connected to or is newly connected to M2M network 110.

For this purpose, client 122 may create a request message (e.g., an HTTP request message) according to a predetermined scheme of M2M application 120, and send the created request message to M2M network 110 (e.g., network SCL 115). More specifically, the created request message may be transferred to a corresponding M2M entity (e.g., M2M device 111 or M2M gateway 112). Thereafter, client 122 may receive a response message responding to the request message, from M2M network 110 (e.g., network SCL 115), and interpret the received response message.

More specifically, network SCL (NSCL) 115 of M2M network 110 may receive the request message sent from client 122, and forward the received request message to a URI address designated by the request message. Through such routing procedures, the request message may be sent to a corresponding device SCL 113.

Device SCL (DSCL) 113 having received the request message may create a response message responding to the request message, and send the created response message to M2M application 120 through a reverse procedure. More specifically, the created response message may be sent to client 122 of M2M application 120.

When receiving the response message, client 122 of M2M application 120 may interpret the received response message, and perform a subsequent procedure using interpretation results.

As described above, a destination of a request message (e.g., an HTTP request message) may be device SCL (DSCL) 113. In other examples, gateway SCL (GSCL) 114 or network SCL (NSCL) 115 may be a destination of a request message. In this case, gateway SCL 114 or network SCL 115 may create a response message and send the created response message to client 122 of M2M application 120.

For example, in the case that a certain M2M device is added to M2M network 110 of a typical M2M communication system (e.g., 100) shown in FIG. 1, M2M application 120 may need to search functions or information of the added M2M device. For this purpose, as described above, a series of routing procedures may be performed to send and receive a request message and a response message thereof.

In this case, M2M application 120 may create and send a message (e.g., an HTTP request message). In particular, M2M application 120 may be required to perform a mutual communication procedure (e.g., a HTTP request/response procedure) several times according to the function, information feature, and/or state change of a corresponding M2M device to be searched. This typical scheme may not quickly accept a variety of environmental changes (e.g., a resource change) in an M2M network.

Meanwhile, the present embodiment relates to managing resources using 'abstract M2M entity objects' and 'high-level programming language instances' (i.e. instances created by embodying the abstract M2M entity objects using high-level programming languages) on an M2M network. Specifically, the present embodiment may detect an M2M network change (e.g., addition of an M2M device) and/or a structure/function change of an M2M entity. When detecting such resource change in the M2M network, the present embodiment may automatically create 'abstract objects' and 'high-level programming language instances' for M2M entities (e.g., M2M devices and/or M2M gateways) associated with a resource change in the M2M network. In other words, the present embodiment may provide a method and system for efficiently searching the change (e.g., a resource change) in the M2M network and coping with the searched change.

Figure 2:
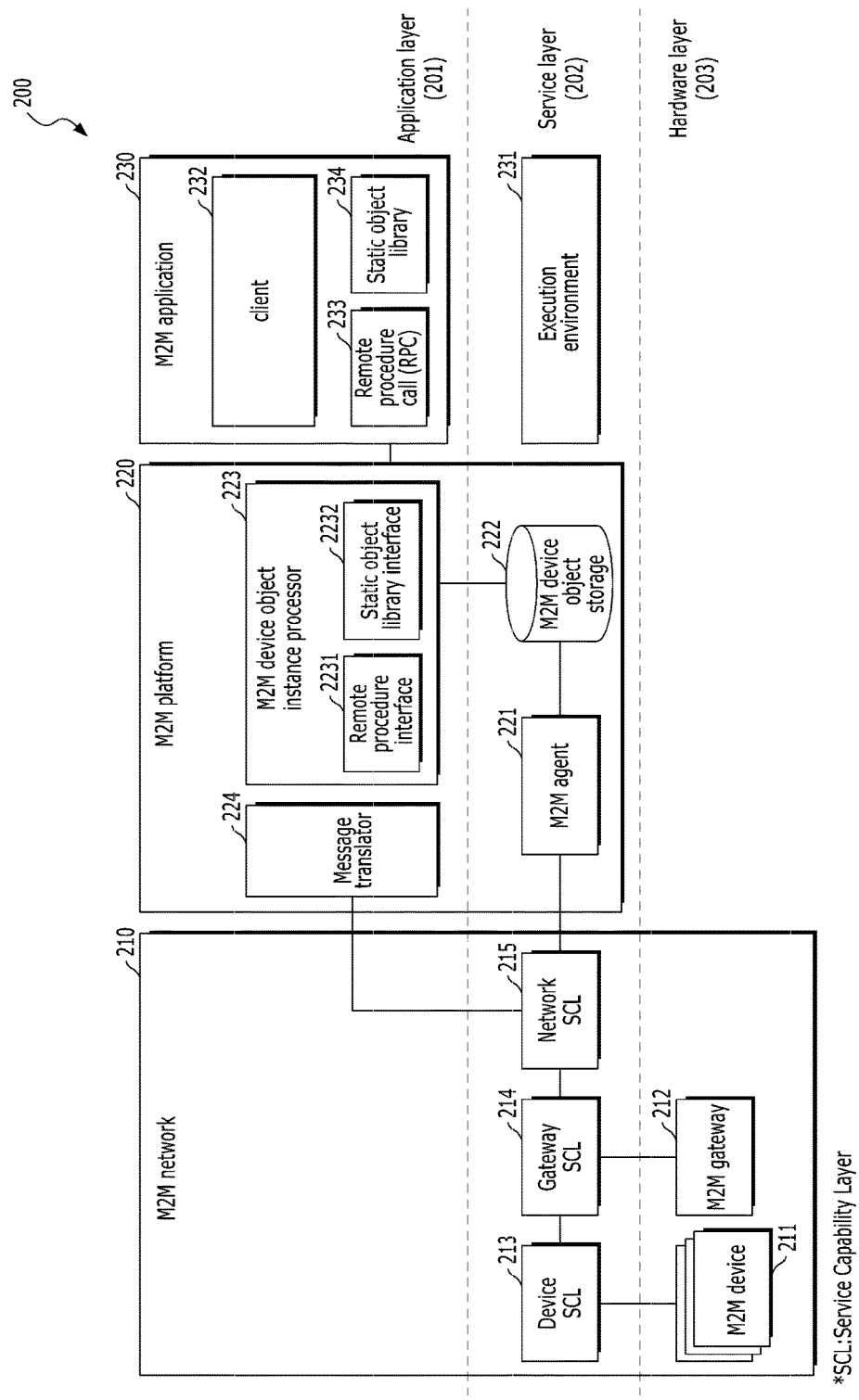
FIG. 2 illustrates interworking between an M2M network, an M2M platform, and an M2M application for performing a resource change management based on an abstract M2M device object in accordance with at least one embodiment.

FIG. 2 illustrates interworking between an M2M network, an M2M platform, and an M2M application performing a resource change management based on an abstract M2M device object in accordance with at least one embodiment. Particularly, FIG. 2 illustrates the M2M platform for automatically creating 'abstract M2M entity objects' and 'high-level programming language instances' according to a resource change in an M2M network. Hereinafter, a resource change may include at least one of (i) addition, deletion (or removal), and/or change of an M2M entity (e.g., an M2M device and/or an M2M gateway) in an M2M network, and (ii) addition, deletion (or removal), and/or change/modification of functions (or constituent elements) associated with the M2M entity, but is not limited thereto.

As shown in FIG. 2, an M2M communication system such as M2M communication system 200 according to the present embodiment may include M2M network 210, M2M platform 220, and M2M application 230. In addition, each of M2M network 210, M2M platform 220, and M2M application 230 may be configured with a plurality of layers, such as application layer 201, service layer 202, and/or hardware layer 203.

Referring to FIG. 2, M2M network 210 may include hardware layer 203 and service layer 202. Herein, hardware layer 203 may include a plurality of M2M devices 211 and M2M gateway 212. Service layer 202 may include (i) device SCL (DSCL) 213 connected to M2M devices 211, (ii) gateway SCL (GSCL) 214 connected to M2M gateway 212, and (iii) network SCL (NSCL) 215. One or more device SCLs (DSCLs) 213 may be registered in gateway SCL 214. One or more gateway SCLs (GSCLs) 214 may be registered in network SCL (NSCL) 215.

M2M platform 220 according to the present embodiment may detect an M2M network change (e.g., addition of an M2M device) and/or a structure/function change of an M2M entity. When detecting such resource change in M2M network 210, M2M platform 220 may create 'abstract M2M entity objects' and 'high-level programming language instances' for M2M entities (e.g., M2M devices and/or M2M gateways) associated with a resource change in M2M network 210.

Meanwhile, service layer 202 of M2M platform 220 may include M2M agent 221 and M2M device object storage 222. Herein, M2M agent 221 may search and detect whether a change occurs in M2M network 210. M2M device object storage 222 may store information (e.g., device information, resource information, etc.) collected by M2M agent 221. In other words, M2M device object storage 222 may store the information collected through a discovery/retrieve operation of M2M device 211.

M2M agent 221 may abstract an M2M entity (e.g., an M2M device and/or an M2M gateway) to an abstract M2M entity object (e.g., an M2M device object and/or an M2M gateway object), using the collected information. M2M agent 221 may store the abstract M2M entity object in M2M device object storage 222. For example, various resource changes may occur in M2M network 210, like the case that (i) a new M2M device is connected (i.e., added) to M2M network 210, (ii) an existing M2M device is disconnected, and/or (iii) operations (or functions) of an M2M device is changed by a software upgrade. In this case, M2M agent 221 may collect information on changed resources from M2M network 210. For this purpose, M2M agent 221 may be pre-registered in a "subscribe" resource inside network SCL (NSCL) 215. In other words, a URI of M2M agent 221 (or a URI of M2M platform 220) may be pre-registered in a "subscribe" resource inside network SCL (NSCL) 215. In this case, if a change (e.g., a resource change) occurs in M2M network 210, M2M network 210 may notify M2M agent 221 of the change. In other embodiments, a URI of M2M agent 221 (or a URI of M2M platform 220) may be pre-registered in gateway SCL (GSCL) 214. Herein, a URI of M2M agent 221 and a URI of M2M platform 220 may be the same or different according to embodiments. For example, in the case that M2M agent 221 is one constituent element included in M2M platform 220 corresponding to a single apparatus, the URI of M2M agent 221 may indicate the URI of M2M platform 220.

For example, in the case that a structure or function of a certain M2M device is changed, M2M agent 221 may receive a resource change notification from M2M network 210. When receiving the resource change notification, M2M agent 221 may re-search a resource structure of a corresponding M2M device. More specifically, M2M agent 221 may collect (or obtain) information (may be referred to as "M2M device information") associated with the corresponding M2M device, by searching the inside of the corresponding M2M device through a discovery operation of the corresponding M2M device. Herein, the collected M2M device information may be information accessible from the outside (e.g., an M2M gateway, an application, etc.). For example, the collected M2M device information may include at least one of function information, attribute information (e.g., brightness, a camera angle, etc. in case of a CCTV camera), device type information (e.g., a device model name), device configuration information, interface information, and descriptions for each resource. Herein, the interface information may be employed in case of calling a certain function. Accordingly, M2M agent 221 may store a variety of collected M2M device information in M2M device object storage 222. Particularly, in the case that changes in an M2M network architecture and/or an M2M device occur, information pre-stored in the M2M device object storage 222 may be updated in real time through the above-described device information collecting procedure.

Referring back to FIG. 2, application layer 201 of M2M platform 220 may include M2M device object instance processor 223 and message translator 224. Herein, message translator 224 may interpret messages (e.g., a request message, a response message, etc.) in the process of data communication with network SCL (NSCL) 215 of M2M network 210.

M2M device object instance processor 223 may create M2M device object instances by embodying abstract M2M device objects stored in M2M device object storage 222 according to each M2M application development environment (e.g., a Linux environment). For example, as described in FIG. 8, an abstract M2M device object may be embodied using a specific high-level programming language (e.g., C++). Such procedure of creating M2M device object instances will be described in more detail with reference to FIG. 8.

Figure 7:
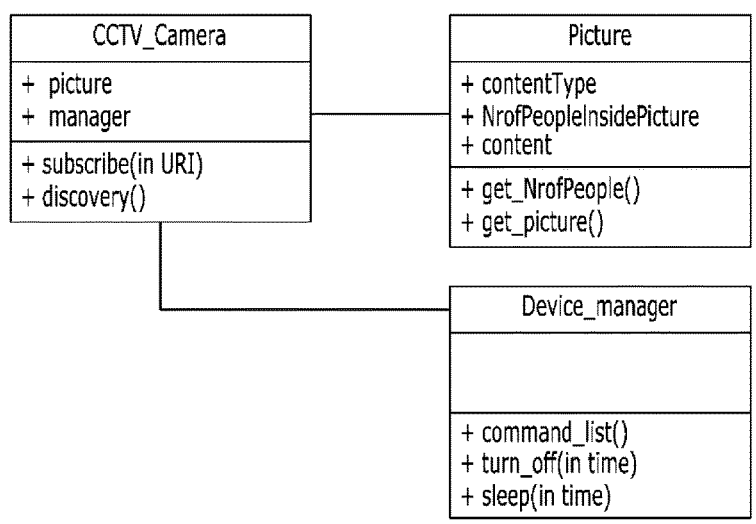
FIG. 7 illustrates an example of an abstract M2M device object in accordance with at least one embodiment.

Specifically, as shown in FIG. 7, an object (e.g., an abstract M2M device object) may contain information on the operation (or function) and structure of a specific entity (e.g., an actual M2M device) by abstracting the specific entity. On the other hand, an instance (e.g., an M2M device object instance) may be created by embodying an abstract entity object (e.g., an abstract M2M device object) according to an application development environment, as shown in FIG. 8. Furthermore, in the case that an "object" is located in an actual computer storage space, a corresponding "instance"

may represent an "embodied object." Herein, the "instance" may contain information on a current operation state of a corresponding entity (e.g., a corresponding M2M device).

An instance used in a general programming language performs a state management using an internal parameter. However, an instance (e.g., an M2M device object instance) according to the present embodiment may include an interface (e.g., an interface between M2M network 210 and M2M application 230). In this case, a call through the interface may be transferred to M2M network 210.

An M2M device object instance created by M2M device object instance processor 223 may provide interfaces in various methods. For example, the M2M device object instance may provide the interfaces using remote procedure call (RPC) interface 2231 and/or static object library 2232.

Remote procedure call (RPC) interface 2231 may be performed by a remote call of M2M application 230. For example, remote procedure call (RPC) interface 2231 may include a variety of typical remote call schemes (e.g., a DCOM model of Microsoft®, a common object request broker architecture (CORBA) model, etc.), and is not limited to a particular technique.

Static object library 2232 may correspond to a static library and be distributed to an M2M application developer. Therefore, static object library 2232 may be used in the development of M2M application 230. For example, in the case that an application developer is a developer who develops a server application implemented with a personal hypertext preprocessor (PHP) program, static object library 2232 may be distributed in a form of a library of a PHP file. In this case, the application developer may use a PHP object library (i.e., static object library 2232 created in a form of PHP library) by including the PHP object library in a project. In the case that an application developer is a developer who uses a C language in a Linux environment, a header file and a shared object (SO) file corresponding to a compiled library may be distributed to the application developer. In summary, each static library may be distributed according to each application development environment. In particular, static object library 2232 may be created by embodying an abstract M2M device object, and therefore include an abstract M2M device object. Accordingly, the application developer may implement an application to make an inquiry to an M2M device or perform an information search operation.

Message translator 224 (or may be referred to as "request/response translator") may perform translation on a request message and a response message that are sent and received through a communication with M2M network 210 and/or M2M application 230. Herein, the request message may be a message requesting information generated in a specific M2M device, and be transferred from M2M application 230 to M2M network 210. The response message may be a message including response data, and be transferred from M2M network 210 to M2M application 230. More specifically, message translator 224 may translate the request message to a message form that can be recognized in M2M network 210. For example, in the case that M2M network 210 complies with the ETSI standard, a request message may be translated to a protocol that can be understood in the standard M2M network. Similarly, the response message may be translated to a message form that can be recognized in M2M application 230.

In addition, when performing a message translation procedure, message translator 224 may reflect a predetermined M2M network operation policy. Herein, the predetermined M2M network operation policy may be predetermined by an M2M network operator. For example, retrieval path information of an M2M device may be included in a URI form (e.g., http://mym2mnetwork.com/1st_gateway/1st_m2m_device/1.0/) in a static software development kit (SDK) distributed to an application developer. In the case that software of the M2M device is upgraded, a new URI information is present different from a previous URI information. In this case, message translator 224 may change the retrieval path information (corresponding to an old version) of the M2M device such that an upgraded software can be called. That is, message translator 224 may automatically change the old URI information (e.g., http://mym2mnetwork.com/1st_gateway/1st_m2m_device/1.0/) to a new URI information (e.g., http://mym2mnetwork.com/1st_gateway/1st_m2m_device/2.0/). In this manner, compatibility by calling a higher version of URI information may be accomplished. As discussed above, message translator 224 may reflect a policy (e.g., a URI update for a path control) of a M2M network operator for a URI access control or other operation purposes.

Meanwhile, M2M application 230 may include a multipurpose software solution that enables a developer to make an application development using M2M network 210 and to distribute an application to a user. Since the function of the M2M application 230 is similar to the function of the M2M application 120 of FIG. 1, a detailed description thereof will be omitted herein.

Service layer 202 of M2M application 230 may correspond to an execution environment 231 for running applications. Execution environment 231 may be configured to control a system driving or a runtime environment, and may be separately configured as shown in FIG. 2. According to another embodiment, M2M application 230 may be configured to directly perform functions of execution environment 231.

As shown in FIG. 2, application layer 201 may include client 232, remote procedure call (RPC) 233, and static object library 234. Client 232 may perform interworking between M2M platform 220 and M2M application 230. When a request message (e.g., a message requesting information or functions of a specific M2M device) is created from M2M application 230, client 232 may send the created request message to M2M network 210 through M2M platform 220.

As described above with reference to FIG. 1, typical M2M communication system 100 directly sends a request message from client 122 to network SCL (NSCL) 115. However, M2M communication system 200 according to the present embodiment may send a request message from client 232 to network SCL (NSCL) 215 through message translator 224 of M2M platform 220. In other words, the request message may be transferred through message translator 224 such that an M2M network operation policy applied to the request message can be equally applied to M2M network 210 and/or M2M application 230. In other embodiments, M2M application 230 may be configured to directly interwork with network SCL (NSCL) 215.

Meanwhile, according to the present embodiment, M2M application 230 may access M2M network 210 (e.g., a corresponding M2M device) using at least one of remote procedure call (RPC) 233 and static object library 234. Hereinafter, M2M network access schemes will be described in more detail.

First, a network access scheme using RPC 233 (i.e., a remote call scheme) will be described below. As described in M2M platform 220, an M2M device object instance created by M2M device object instance processor 223 may provide remote procedure call (RPC) interface 2231 according to each application development environment. Therefore, in the case that a remote procedure call (RPC) client function capable of calling remote procedure call (RPC) interface 2231 is included in M2M application 230, M2M application 230 may access M2M network 210 through the RPC client function.

Alternatively, M2M application 230 may access M2M network 210 using static object library 234. Herein, static object library 234 created and distributed according to an M2M application development environment may include a variety of information request (or call) functions. Therefore, when a user creates and manipulates the abstract object, a manipulation message may be translated to a RESTful message in client 232 and then sent to M2M platform 220.

As described above, in M2M communication system 200 of FIG. 2 according to the present embodiment, M2M platform 220 may be one embodiment used for implementing the present embodiment. Accordingly, M2M platform 220 is not limited to the platform format, and internal functions constituting the platform may be variously implemented in new forms and combinations. M2M platform 220 according to the present embodiment will be described below in more detail with reference to FIG. 3.

Figure 3:
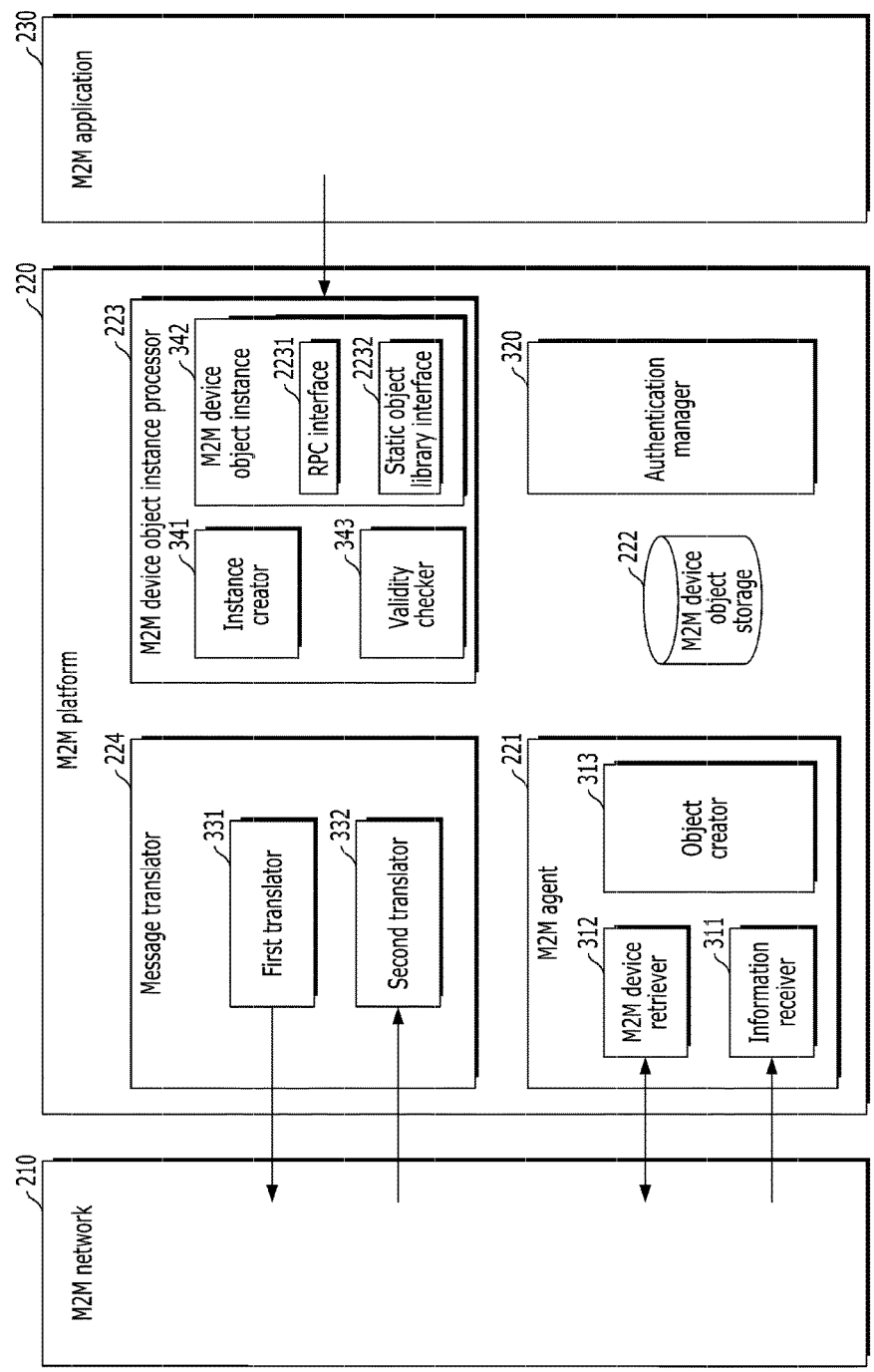
FIG. 3 illustrates a detailed structure of an M2M platform in accordance with at least one embodiment.

FIG. 3 illustrates a detailed structure of an M2M platform in accordance with at least one embodiment.

As shown in FIG. 3, M2M platform 220 according to the present embodiment may be connected to M2M network 210 and M2M application 230. Referring to FIG. 3, M2M platform 220 according to the present embodiment may include M2M agent 221, M2M device object storage 222, authentication manager 320, message translator 224, and/or M2M device object instance processor 223. Particularly, M2M platform 220 may include at least one hardware processor. More specifically, at least one of constituent elements (e.g., 221, 222, 223, 224, 320) may be configured with a hardware processor.

M2M agent 221 may create an abstract M2M entity object (e.g., an abstract M2M device object) for an M2M entity (e.g., an M2M device), based on information (e.g., M2M device information) on the M2M entity caused a resource change on M2M network 210. More specifically, M2M agent 221 may include information receiver 311, M2M device retriever 312, and object creator 313.

Information receiver 311 may detect (or recognize) a change (e.g., a resource change) in M2M entity (e.g., an M2M device, an M2M gateway). For example, information receiver 311 may receive a resource change notification (i.e., a notification message informing a resource change) from M2M network 210. In this case, information receiver 311 may detect (or recognize) the resource change through the received resource change notification. In other embodiments, M2M agent 221 may detect (or recognize) a resource change by monitoring M2M network 210. When detecting or recognizing the resource change, information receiver 311 may send information and/or a notification associated with the resource change to M2M device retriever 312. Information receiver 311 may have a URI capable of receiving the resource change notification from M2M network 210. For this, as described above, a URI of M2M agent 221 (or a URI of information receiver 311) may be pre-registered in a "subscribe" resource inside network SCL (NSCL) 215.

M2M device retriever 312 (which may also be referred to as "an M2M device crawler") may search internal functions and/or information of M2M devices. More specifically, when receiving a resource change notification from information receive 311, M2M device retriever 312 may obtain a URI list associated with a resource change generated in M2M network 210, and perform an individual search using each URI. Herein, the URI list may include one or more URIs of one or more M2M entities where a resource change occurs. The URI list may be obtained through a discovery operation performed in M2M network 210. Furthermore, M2M device retriever 312 may collect information on each corresponding M2M device through the individual search. In this case, M2M device retriever 312 may collect more information by repetitively performing an internal search on each corresponding M2M device. Herein, information (may be simply referred to as "M2M device information") collected (or obtained) by M2M device retriever 312 may include at least one of function information, attribute information, device type information (e.g., a device model name), device configuration information, interface information, and descriptions for each resource.

Object creator 313 (which may also be referred to as "object builder") may create abstract M2M device objects, based on the information collected by M2M device retriever 312. Object creator 313 may create data structures matched with various object models, based on the collected M2M device information. The abstract M2M device objects created by object creator 313 may be stored in M2M device object storage 222. Herein, M2M device object storage 222 may be referred to as "M2M entity object storage" since an M2M entity includes an M2M device and an M2M gateway. The abstract M2M device objects will be described in more detail with reference to FIG. 7.

Authentication manager 320 may perform an authorization management on M2M network 210. In order for M2M platform 220 to access M2M network 210, an authorization procedure associated with an access right of M2M platform 220 may be required to be performed. In this case, authentication manager 320 may perform an authorization procedure between M2M network 210 and M2M platform 220, and an authorization procedure between M2M network 210 and M2M application 230. For example, in order to call a discovery operation, M2M platform 220 may be required to obtain at least a "READ" right. Therefore, authentication manager 320 may request and receive the READ right, and exchange key values associated with the READ right. In addition, authentication manager 320 may manage, in pairs, M2M network 210 and M2M application 230 managed in M2M platform 220. Specifically, authentication manager 320 may store a key value assigned in one authentication request and use the stored key value at the time of a subsequent authentication request. Such a function may provide additional convenience to M2M application 230.

As described in FIG. 2, message translator 224 may perform a message protocol translation such that messages can be exchanged between M2M network 210 and M2M application 230. As shown in FIG. 3, message translator 224 may include first translator 331 and second translator 332. First translator 331 may perform a protocol translation necessary for sending a request message from M2M application 230 to M2M network 210. Second translator 332 may perform a protocol translation necessary for sending a response message from M2M network 210 to M2M application 230. Accordingly, first translator 331 and second translator 332 may be referred to as "a request translator" and "a response translator," respectively.

A consistent protocol may be employed in an M2M network. Therefore, message translator 224 may be implemented such that a policy set by an M2M network operator is reflected to a message translation procedure. Herein, the policy set by an M2M network operator may include a protocol translation scheme per M2M application running environment, a forced routing to a specific M2M device according to information request, and the like.

As shown in FIG. 3, message translator 224 may be divided into first translator 331 and second translator 332 as shown in FIG. 3, but is not limited thereto. In other embodiments, the functions of first translator 331 and second translator 332 may be integrally performed in message translator 224.

Meanwhile, M2M device object instance processor 223 may include instance creator 341, M2M device object instance 342, and validity checker 343. Herein, instance creator 341 may create an M2M device object instance by embodying an abstract M2M device object stored in M2M device object storage 222, according to application development environments or the use of an M2M application. M2M device object instance 342 created by instance creator 341 may provide interfaces. M2M entity object instance 342 may be embodied in a form of a static library or a remote procedure call (RPC) interface. For example, as shown in FIG. 3, M2M device object instance 342 may provide RPC interface 2231 and static object library interface (or may be simply referred to as "static library interface") 2232. Herein, RPC interface 2231 may be an interface for coping with a direct remote call from M2M application 230. Meanwhile, M2M application 230 may transmit a request to M2M platform 220, based on static object library 234 distributed by M2M platform 220. In this case, static object library interface 2232 may handle a request transmitted from M2M application 230. Accordingly, static object library interface 2232 may be referred to as "a library support interface." In other embodiments, RPC interface 2231 and static object library interface 2232 may be integrally implemented into a single interface according to a library specification distributed for M2M application 230.

Meanwhile, M2M device object instance processor 223 may include a validity checker (or may be referred to as "a request validity checker") 343 that checks a validity of a request received through the interface (e.g., 2231, 2232). Validity checker 343 may check whether a request from M2M application 230 (e.g., a request received through the interface 2231 or 2232) is valid, based on the information (e.g., attribute information, URI information, etc.) stored in M2M device object storage 222. More specifically, validity checker 343 may determine at least one of (i) whether there actually exists a device attribute, an M2M device, and/or a corresponding resource associated with the request, (ii) whether a target URI (i.e., a URI of an M2M device to be accessed) is valid, and (iii) whether the request is associated with a proper access type and/or an access right. In this case, validity checker 343 may prevent an invalid request message from entering a message translation procedure. In another embodiment, function of validity checker 343 may be implemented in RPC interface 2231 and/or static object library interface 2232.

Hereinafter, in case of a resource change in M2M network 210, a resource change management procedure based on M2M communication system architectures of FIG. 2 and FIG. 3 will be described in more detail with reference to FIG. 4 and FIG. 5 below.

M2M device object instance processor 223 may be referred to as "M2M entity object instance processor" since an M2M entity includes an M2M device and an M2M gateway.

As described above, an M2M entity includes an M2M device and an M2M gateway. The present embodiment may be applied to the M2M gateway. Accordingly, M2M device object instance processor 223, M2M device object storage 222, M2M device retriever 312, and M2M device object instance 342 may be referred to as "M2M entity object instance processor," "M2M entity object storage," "M2M entity retriever," and "M2M entity object instance," respectively.

Figure 4:
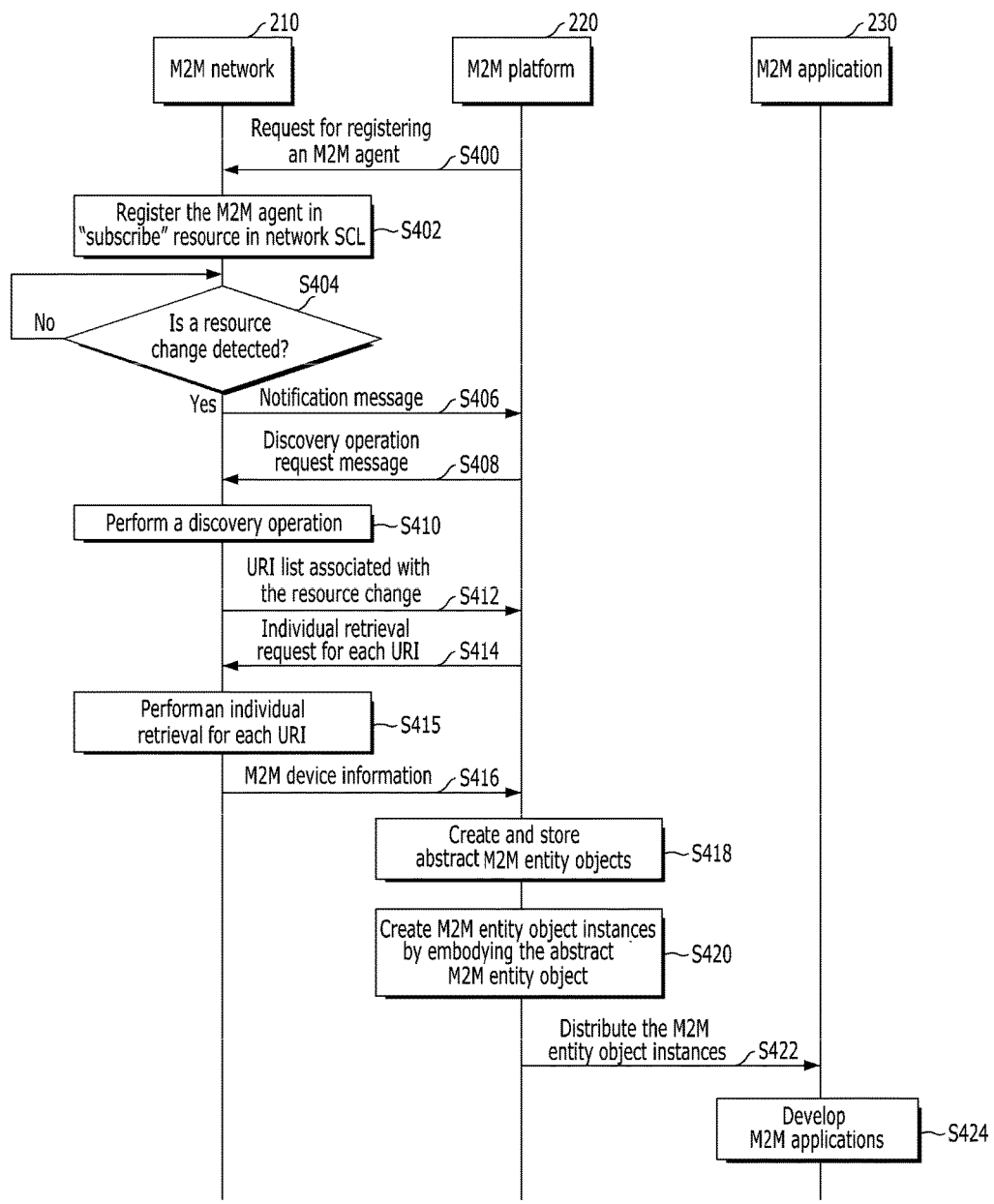
FIG. 4 illustrates a method of automatically creating an abstract M2M device object and an M2M device instance in accordance with at least one embodiment.

FIG. 4 illustrates a method of automatically creating an abstract M2M device object and an M2M device instance in accordance with at least one embodiment. FIG. 4 illustrates an example of a procedure of automatically creating 'abstract M2M entity objects' and 'high-level programming language instances' (i.e. instances created by embodying the abstract M2M entity objects using high-level programming languages), in case of a resource change in M2M network 210.

Referring to FIG. 4, at step S400, M2M platform 220 according to the present embodiment may send a request for registering M2M agent 221, to M2M network 210 in order to receive a resource change notification ("S406") from M2M network 210. In other words, M2M platform 220 may perform a registration request in order to search a resource change in M2M network 220, in real time, through M2M agent 221.

At step S402, receiving the request from M2M platform 220, M2M network 210 may register M2M agent 221 in a "subscribe" resource inside network SCL (NSCL) 215 of M2M network 210. In this case, a URI of M2M agent 221 (or a URI of M2M platform 220) may be pre-registered in the "subscribe" resource inside network SCL (NSCL) 215. Since the subscription procedure of M2M agent 221 was already described with reference to FIG. 2 and FIG. 3, the detailed description thereof is omitted.

At step S404, M2M network 210 may detect a resource change associated with M2M entity (e.g., an M2M device and an M2M gateway). In the case that a plurality of M2M devices 211 are connected to M2M gateway 212, device SCLs (DSCLs) 213 of a plurality of M2M devices 211 may be registered in gateway SCL (GSCL) 214. In order to observe a resource change associated with M2M devices 213, subscribe items for detecting a change in the state of M2M devices 213 registered in M2M gateway 212 may be set to M2M gateway SCL 214. Accordingly, in M2M network 210, a resource change associated with M2M entity may be performed based on the subscribe items registered in gateway SCL (GSCL) 214.

At step S406, when the resource change is detected (Yes—S404), M2M network 210 may sends a notification message to M2M platform 220 in order to notify information on an occurrence of the resource change. More specifically, M2M network 210 may transmit the notification message to M2M agent 221, using a URI of M2M agent 221 (or a URI of M2M platform 220) pre-registered at steps S400 and S402.

When receiving the notification message from M2M network 210, M2M platform 220 may recognize a change in M2M network 210 through the notification message. Accordingly, at step S408, M2M platform 220 may create a request message requesting a discovery operation on a changed resource (e.g., a changed M2M device), and send the created request message ("discovery operation request message") to M2M network 210.

At step S410, when receiving the discovery operation request message from M2M platform 220, M2M network 210 may perform a discovery operation to obtain a URI list associated with the detected resource change (i.e., a URI list of one or more M2M entities (e.g., M2M devices) associated with the detected resource change). In other words, M2M network 210 may obtain URI information associated with the detected resource change, by performing the discovery operation. In other embodiments, M2M network 210 may further obtain functions and/or information which can be provided by M2M entities associated with the detected resource change.

At step S412, M2M network 210 may send the URI list to M2M platform 220. For example, in the case that (i) M2M device 'A' is newly added in M2M network 210 and (ii) a specific function is added to M2M device 'B', the URI list may include a URI of M2M device 'A' and a URI of M2M device 'B'. Furthermore, in other embodiments, the URI list may include the functions and/or the information which can be provided by M2M entities associated with the detected resource change.

M2M platform 220 may recognize M2M entities (e.g., M2M devices) associated with the resource change, through the URI list sent from M2M network 210. Furthermore, M2M platform 220 may recognize a structure of M2M entities (e.g., M2M devices) associated with the resource change through the URI list. At step S414, in order to obtain more detailed information, M2M platform 220 may send an individual retrieval request message requesting retrieval (i.e., an individual retrieval) per each URI included the URI list, to M2M network 210.

At step S415, when receiving the individual retrieval request form M2M platform 220, M2M network 210 may perform an individual retrieval procedure. More specifically, M2M network 210 may obtain M2M entity information (e.g., M2M device information) on each M2M entity corresponding to each URI, by sending a "RETRIEVE" message to each URI.

At step S416, M2M network 210 may send the obtained M2M entity information to M2M platform 220. Herein, the M2M entity information may include at least one of function information, attribute information, entity type information (e.g., a device model name), entity configuration information (e.g., M2M device configuration information), interface information, and descriptions for each resource.

At step S418, when receiving the M2M entity information from M2M network 210, M2M agent 221 of M2M platform 220 may create 'abstract M2M entity objects' (e.g., abstract M2M device objects) based on the received M2M entity information, and store the created M2M entity objects in M2M device object storage 222. A procedure of creating the abstract M2M entity objects will be described in more detail with reference to FIG. 7.

Operations of steps S406 to S418 may be repetitively performed whenever a resource change occurs in M2M network 210. Accordingly, M2M platform 220 may repetitively update M2M device object storage 222. If the discovery operation (S410) is repetitively performed on all parts of a corresponding SCL whenever a resource change occurs in M2M network 210, a large load may be imposed. Accordingly, in another embodiment, a partial discovery operation may be performed only for a changed part recognized through the notification message (S406). For this, when sending the discovery operation request message (S408), M2M platform 220 may send a "filter Criteria" factor along with the discovery operation request message. Herein, the notification message may include information on 'changed parts' associated with a resource change in M2M network 210.

At step S420, M2M platform 220 may create M2M entity object instances (e.g., M2M device object instances) by embodying the abstract M2M entity objects (e.g., abstract M2M device objects) created/stored at step S418. More specifically, M2M platform 220 may create M2M entity object instances (e.g., M2M device object instances) by embodying the abstract M2M entity objects according to application development environments. That is, the M2M entity object instances (e.g., M2M device object instances) may be created by a high-level programming language corresponding to each application development environments. Particularly, the M2M entity object instances may include interface function such as an RPC interface and/or a static object library interface. Accordingly, the M2M entity object instances may be classified into (i) an M2M entity object instance of an RPC interface type (may be simply referred to "an RPC interface type instance"), and/or (ii) an M2M entity object instance of a static library interface (may be simply referred to as "a static library type instance" or "a static library interface"). Herein, the RPC interface type instance may include an interface capable of performing a remote call function, and may not include an abstract M2M entity object. Meanwhile, the static library type instance may be an instance embodied in a form of a static object library, and include the abstract M2M entity object and an interface function associated with an access to a corresponding M2M entity. A procedure of creating the static library type instance will be described in more detail with reference to FIG. 8.

At step S422, M2M platform 220 may transmit (or distribute) the created M2M entity object instances to an M2M application domain (e.g., M2M application 230, and/or an M2M application developer terminal).

At step S424, an M2M application developer may develop a variety of M2M applications based on the M2M entity object instances. In at least one embodiment, in the case that M2M application 230 was created based on a previously distributed M2M entity object instance, M2M application 230 may perform an application update based on M2M entity object instances newly distributed due to a resource change.

Figure 5:
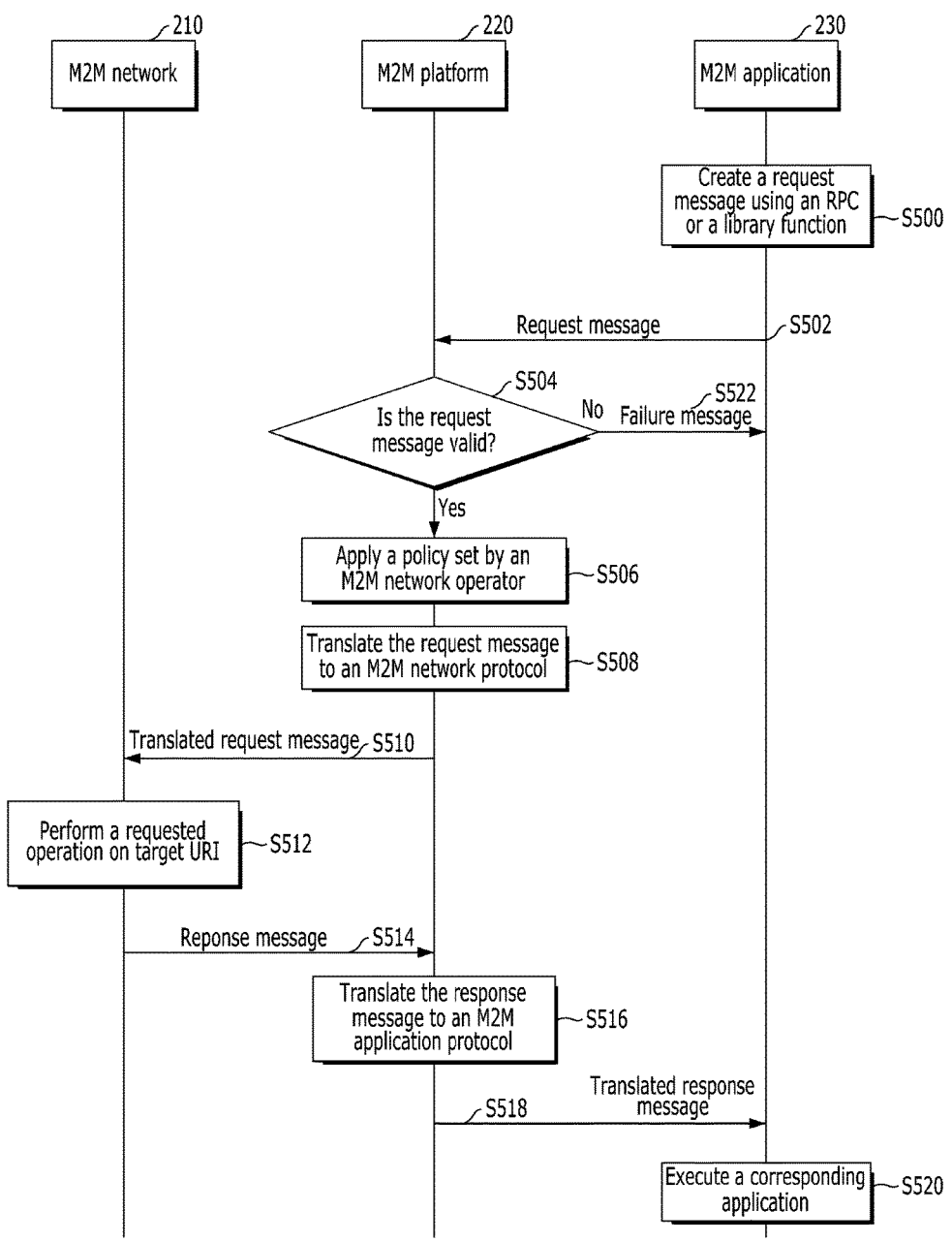
FIG. 5 illustrates a method of processing a request of an M2M application in an M2M platform, in accordance with at least one embodiment.

FIG. 5 illustrates a method of processing a request of an M2M application in M2M platform 220, in accordance with at least one embodiment. In other words, FIG. 5 illustrates a method of performing a message exchange between M2M application 230 and M2M network 210. As shown in FIG. 5, M2M platform 220 may perform a message transfer and/or a message protocol translation such that a communication between M2M application 230 and M2M network 210 is performed.

As described in FIG. 4, an M2M application developer may develop a variety of M2M applications (e.g., 230) based on a distributed M2M entity object instance.

Referring to FIG. 5, at step S500, M2M application 230 according to the present embodiment may create a request message (may referred to as "a call message") using an RPC function and/or a library function associated with the M2M entity object instance. In other words, M2M application 230 may request an M2M device (e.g., a sensor) to send information (e.g., sensing results), using an RPC function and/or a library function included an M2M entity object instance distributed from M2M platform 220.

At step S502, M2M application 230 may transmit the created request message to M2M platform 220. More specifically, M2M application 230 may transmit the created request message to M2M platform 220, according to a call scheme (e.g., call schemes using the RPC function or the library function) corresponding to an application development environment of M2M application 230.

For example, in the case of using the RPC function, M2M application 230 may create the request message and send the created request message to M2M platform 220, according to a procedure (e.g., a corresponding standard procedure) mutually predetermined based on a corresponding application execution environment. In the case of using the library function, the request message may be translated based on a corresponding standard complying with an execution environment, in a corresponding library, and be sent to M2M platform 220.

Meanwhile, the request message sent by M2M application 230 may be forwarded to validity checker 343 of M2M platform 220. At step S504, validity checker 343 of M2M platform 220 may determine whether the request message is valid. More specifically, validity checker 343 may check a validity of the received request message, based on M2M device object instance and/or the information (e.g., attribute information, URI information, etc.) stored in M2M device object storage 222. For example, validity checker 343 may determine at least one of (i) whether there actually exists a device attribute, an M2M device, and/or a corresponding resource associated with the request message, (ii) whether a target URI (i.e., a URI of an M2M device to be accessed) is valid, and (iii) whether the request message is associated with a proper access type and/or an access right.

When the receive request message is not valid (No—S504), at step S522, M2M platform 220 may send a failure message (or an error message) to M2M application 230.

When the receive request message is valid (Yes—S504), at step S506, M2M platform 220 may apply a policy set by an M2M network operator. More specifically, in this case, M2M platform 220 may perform a required modification operation (e.g., a modification operation of URI and/or parameters) associated with a network related update due to a resource change in M2M network 210.

Furthermore, at step S508, M2M platform 220 may translate the request message to an M2M network protocol. More specifically, message translator 224 of M2M platform 220 may perform an operation procedure of translating the request message to a specific protocol corresponding to M2M network 210 such that an access to an M2M device corresponding to the requested resources is properly performed. For example, when M2M network 210 complies with the ETSI standard, the request message may be translated into an HTTP message according to the ETSI M2M standard.

At step S510, M2M platform 220 may transmit the translated request message (e.g., an HTTP request message) to M2M network 210. In other embodiments, before sending the translated message to M2M network 210, M2M platform 220 may perform a procedure of acquiring a predetermined M2M device access right. In the case that M2M platform 220 obtains the predetermined M2M device access right, M2M platform 220 may transmit the translated request message to M2M network 210, based on the access right. For example, M2M platform 220 having acquired the access right may request a discovery operation of retrieving functions and/or information that can be provided by an M2M device associated with the request message.

At step S512, when receiving the translated request message from M2M platform 220, M2M network 210 may perform a requested operation associated with the target URI. Herein, the requested operation may be an operation (e.g., CREATE, RETRIEVE, UPDATE, REMOVE, etc.) requested by the request message. For example, in the case that the received request message is a message requesting a "RETRIEVE" operation associated with a target resource, M2M network 210 may obtain at least one of function information, attribute information, device type information (e.g., a device model name), device configuration information, interface information, and descriptions for each resource, by performing the "RETRIEVE" operation.

At step S514, when the requested operation is complete, M2M network 210 may transmit a response message (i.e., a result message) to M2M platform 220. More specifically, M2M network 210 may transmit information obtained through the requested operation to M2M platform 220 in a form of the response message according to the request message.

At step S516, when receiving the response message from M2M network 210, M2M platform 220 may translate the received response message to an M2M application protocol. Herein, the M2M application protocol may be a message protocol complying with a development environment of M2M application 230.

At step S518, M2M platform 220 may send the translated response message to M2M application 230. Herein, the translated response message may include at least one of callback information, an RPC interface information, and library function information.

At step S520, when receiving the translated response message from M2M platform 220, M2M application 230 may be executed based on the received response message.

In summary, as described above, M2M platform 220 according to the present embodiment may act as M2M application 230. Specifically, M2M platform 220 may access a desired M2M device stepwise, enable M2M network 210 to perform a desired operation, receive an operation result, and transfer the operation result.

Figure 6:
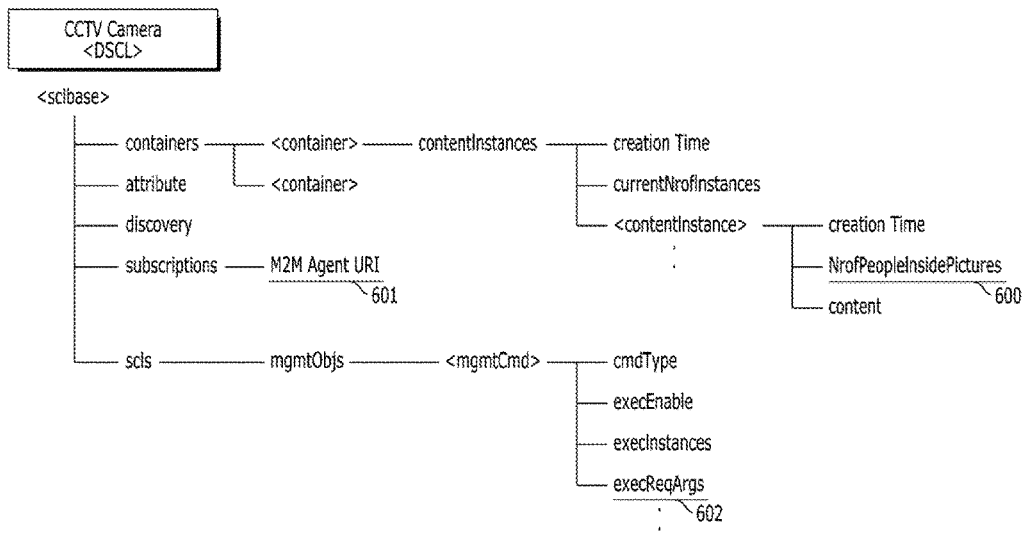
FIG. 6 illustrates an example of a device SCL (DSCL) structure in accordance with at least one embodiment.

FIG. 6 illustrates an example of a device SCL (DSCL) structure in accordance with at least one embodiment.

For example, in the case that an M2M device is a closed circuit television (CCTV) camera, a device SCL (DSCL) may be implemented in conformance with a corresponding standard of an M2M communication system, as shown in FIG. 6.

Referring to FIG. 6, various resources (e.g., containers, attribute, discovery, subscriptions, scls) may exist under <sclBase> corresponding to a basic structure template. The "containers" resource may be a space where data generated by a corresponding device (e.g., CCTV camera) is accumulated. The "contentInstance" resource stored under the "containers" resource may correspond to data generated at a specific time. For example, in the case that an M2M device is a CCTV camera, the "contentInstance" resource may store image information at a specific time.

Hereinafter, description will be given under the assumption that an M2M device is a CCTV camera, and software of the CCTV camera is updated. For example, (i) a function of counting the number of people (i.e., people captured by the CCTV camera) included in the image information (e.g., a picture) stored in the <contentInstance> resource and (ii) a function of storing information on the number of people together with a corresponding picture may be added to a corresponding device SCL (DSCL). In this case, the "NrofPeopleInsidePictures" attribute 600 may be newly added under the <contentInstance> resource. Accordingly, captured image information and the number of people included in the image information may be stored together.

As described above, in the case that a resource structure is changed due to a software update of an M2M device, M2M network 210 may transmit a notification message (i.e., a resource change notification) to M2M platform 220 (more specifically, a URI ("601") of M2M agent 221) registered in the "subscriptions" resource. When receiving the notification message, M2M platform 220 may initiate a re-search procedure on an entire SCL structure. M2M device retriever 312 may recognize that the "NrofPeopleInsidePictures" resource (600) has been added to the resource of a corresponding M2M device (e.g., a CCTV camera) through the re-search procedure.

In addition, it is assumed that a sleep mode function (i.e., a function which can change the CCTV camera to a sleep state) has been added by a software update. For example, in the resource structure, new items may be added to an <mgmtCmd> resource of an "mgmtObjs" resource under the "scls" resource, as shown in FIG. 6. In this case, M2M platform 220 may receive a notification message due to a change in the resource structure. Therefore, by re-searching an SCL structure of a corresponding M2M device, M2M device retriever 312 may recognize that the management function (e.g., a sleep mode function) has been added. Thereafter, by searching an "exeReqArgs" resource (602) under the <mgmtCmd> resource, M2M device retriever 312 may know that the sleep mode function of a corresponding M2M device is an "operation of receiving a time factor and switching to a standby mode after the elapse of a certain period."

FIG. 7 illustrates an example of an abstract M2M device object in accordance with at least one embodiment.

As described above, M2M platform 220 (more specifically, M2M agent 221) may create an abstract M2M entity object (e.g., an abstract M2M device object), based on collected M2M device information. Herein, the collected M2M device information may include at least one of function information, attribute information, device type information (e.g., a device model name), device configuration information, interface information, and descriptions for each resource. The abstract M2M entity object(s) may be stored in M2M device object storage 222.

As shown in FIG. 7, an abstract M2M entity object may be created through an object modeling technique (e.g., unified modeling language). In the case that an M2M device is a CCTV camera, (i) the CCTV camera, (ii) image information (e.g., a picture) stored in the CCTV camera, and (iii) a CCTVE camera management function (e.g., a sleep mode function), which have been described with reference to FIG. 6, may be abstract to a single abstract object. As shown in FIG. 7, the abstract M2M device object may include functions and information associated with each resource (e.g., the CCTV camera, the image information, and the CCTV camera management function).

In a case of converting the resource structure of FIG. 6 to the abstract M2M device object illustrated in FIG. 7, it may be necessary to perform a predetermination procedure such as an object creation range determination (e.g., an issue regarding to what extent the object is to be created among a plurality of information and functions of a corresponding M2M device) and an object parameter determination (e.g., an issue regarding which resource of attributes inside the "contentInstance" resource is to be set as an object parameter).

As shown in FIG. 7, the abstract device object may include resources (or functions) associated with the retrieval of the newly added "NrofPeopleInsidePicture" parameter (i.e., a parameter which is set according to the addition of the function of counting the number of people contained in a corresponding image information) and the call of the sleep mode function. Accordingly, the retrieval of the "NrofPeopleInsidePicture" parameter and the call of the sleep mode function may be easily performed the abstract device object. Abstract M2M device objects according to the present embodiment are not limited to the abstract device objects shown in FIG. 7, and various abstract objects may be created according to various object creation policies Meanwhile, an M2M entity object instance (e.g., an M2M device object instance) may be created by embodying the abstract M2M entity object (e.g., abstract M2M device object) using a high-level programming language according to each application development environment. Such instance creation procedure and an example thereof will be described in more detail with reference to FIG. 8 below.

FIG. 8 illustrates an example of an M2M device object instance in accordance with at least one embodiment. More specifically, FIG. 8 illustrates an M2M device object instance embodied in a form of a C++ type static library, in the case that an M2M device is a CCTV camera.

As described above, an M2M entity object instance (e.g., an M2M device object instance) may be created by embodying an abstract M2M entity object (e.g., abstract M2M device object) using a high-level programming language according to each application development environment. The created M2M entity object instance may be distributed/provided to M2M application developers. In this case, the M2M application developers may implement a variety of M2M applications using the distributed M2M entity object instance(s).

More specifically, each of sub-objects (e.g., Picture, Device_manager) illustrated in FIG. 7 may be embodied as a single C++ class as shown in FIG. 8. Furthermore, the M2M device object instance of a static library type may provide an interface enabling an access to the exposed (i.e., included) operations and parameters of the M2M device object instance. As described above, the M2M device object instance of a static library type may be simply referred to as "a static object library," "a static object library interface," or "a library interface."

The library interface configured according to the present embodiment is more developer-friendly than a typical (or existing) message of the RESTful HTTP format based on the ETSI standard. More specifically, an M2M application developer needs not know a complicated internal architecture of a corresponding M2M device and information on a typical (or existing) HTML message. According to the present embodiment, a plurality of interface procedures or all interface procedures may be simplified as a single function call. Therefore, the M2M application developer may develop a variety of M2M applications more quickly by applying an integrated development environment (IDE).

As described above, the present embodiment may provide a method for automatically abstracting a certain M2M entity (e.g., a new M2M device) to a software object according to a resource change in an M2M network. Furthermore, the present embodiment may provide a method for creating a high-level language object instance (e.g., a high-level language object instance of an RPC interface type, or high-level language object instance of a static library type) from the abstract software object of the certain M2M entity In addition, the present embodiment may provide a system that performs routing according to a policy set by an M2M network operator, and transmits the routing result to a developer application, when requesting an access to an M2M entity (e.g., an M2M device) through a distributed high-level language object instance (e.g., a high-level language object instance of an RPC interface type, or high-level language object instance of a static library type).

In addition, the present embodiment may enable an M2M application developer to easily use an M2M entity (e.g., an M2M device), based on an abstract library of the M2M entity, without separately re-searching an infrastructure of the M2M entity.

In addition, the present embodiment may enable operators to conveniently operate an M2M network and an M2M entity by separating a change (e.g., a resource change) in M2M network/entity configuration from an interface for a developer.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of managing a resource change in a machine to machine (M2M) network, the method comprising:
   registering with the M2M network by an M2M agent to search in real time resource changes in the M2M network;
   detecting a resource change in the M2M network;
   receiving a resource change notification from the M2M network;
   obtaining information on at least one M2M entity associated with the resource change notification, from the M2M network;
   creating an abstract M2M entity object for each M2M entity, based on the M2M entity information;
   storing the created abstract M2M entity object; and
   creating an M2M entity object instance by embodying each abstract M2M entity object according to an M2M application development environment.

2. The method of claim 1, further comprising:
   transmitting the M2M entity object instance to at least one of an M2M application and an M2M application developer terminal.

3. The method of claim 1, wherein the M2M entity is at least one of an M2M device and an M2M gateway.

4. The method of claim 1, wherein registering with the M2M further comprises:
pre-registering a unique resource identifier (URI) to receive the resource change notification.

5. The method of claim 4, wherein the URI is pre-registered in at least one of a network service capability layer (NSCL) and a gateway service capability layer (GSCL).

6. The method of claim 1, wherein the obtaining includes:
transmitting a discovery operation request to the M2M network when the resource change notification is received;
receiving a URI list associated with the resource change from the M2M network;
transmitting an individual retrieval request for each URI included the URI list, to the M2M network; and
obtaining the M2M entity information from the M2M network.

7. The method of claim 1, wherein the M2M entity information includes at least one of function information, attribute information, M2M entity type information, M2M entity configuration information, interface information, and descriptions for each resource.

8. The method of claim 1, wherein the M2M entity object instance is embodied in a form of at least one of a static library and a remote procedure call (RPC) interface.

9. The method of claim 8, wherein the M2M entity object instance is embodied using a high-level programming language.

10. A platform apparatus for managing a resource change in a machine to machine (M2M) network, the platform apparatus comprising:
an M2M agent configured to register with the M2M network to search in real time resource changes in the M2M network, receive a resource change notification from the M2M network, and create an abstract M2M entity object for each of one or more M2M entity associated with the resource change, based on information on each M2M entity; and
an object instance creation processor configured to create an M2M entity object instance by embodying the abstract M2M entity object according to an application development environment, wherein the M2M entity object instance includes an interface function for a request of an M2M application.

11. The platform apparatus of claim 10, further comprising:
a message translator configured to perform a message protocol translation for a data communication between the M2M network and the M2M application.

12. The platform apparatus of claim 11, wherein:
the message translator is configured to further reflect a predetermined M2M network operation policy; and
the predetermined M2M network operation policy includes a unique resource identifier (URI) update for a path control.

13. The platform apparatus of claim 10, wherein the M2M agent is configured to further:
obtain the information on each M2M entity from the M2M network.

14. The platform apparatus of claim 13, wherein the M2M agent is configured to:
(i) transmit a discovery operation request to the M2M network when the resource change notification is received;
(ii) receive a URI list associated with the resource change from the M2M network;
(iii) transmit an individual retrieval request for each URI included the URI list, to the M2M network; and
(iv) obtain the information on each M2M entity from the M2M network.

15. The platform apparatus of claim 10, wherein the M2M entity information includes at least one of function information, attribute information, M2M entity type information, M2M entity configuration information, interface information, and descriptions for each resource.

16. The platform apparatus of claim 10, wherein the M2M entity object instance is embodied in a form of at least one of a static library and a remote procedure call (RPC) interface.

17. The platform apparatus of claim 10, wherein the object instance creation processor is configured to further:
receive a request message from the M2M application; and
determine whether to transfer the request message to the M2M network, according to a validity of the request message.

18. The platform apparatus of claim 17, wherein the validity of the request message is determined based on the M2M entity object instance.

* * * * *